April 21, 1964  R. M. MILTON  3,130,021
DRYING CRACKED GAS

Filed Dec. 28, 1959  5 Sheets-Sheet 1

FIG. I

INVENTOR.
ROBERT M. MILTON

BY William F. Mesinger

ATTORNEY

United States Patent Office 3,130,021
Patented Apr. 21, 1964

3,130,021
DRYING CRACKED GAS
Robert M. Milton, Buffalo, N.Y., assignor to Union Carbide Corporation, a corporation of New York
Filed Dec. 28, 1959, Ser. No. 862,222
6 Claims. (Cl. 55—33)

This invention relates to the drying of cracked gas and more particularly relates to an improved process for drying a thermally cracked hydrocarbon gas stream by contacting such stream with an adsorbent material which process is conducive to long capacity life of the adsorbent material.

Drying of cracked gas is extremely important to industry for several reasons. For example, if the water is not removed, hydrocarbon hydrates are formed which deposit as solids. Such hydrates can cause plugging of pipelines, freezing of valves and regulators or fouling of fractionating columns wherein the cracked gas is demethanized in the recovery of unsaturated hydrocarbons.

Almost everyone who has operated a variety of fractionating equipment has, at one time or another, had difficulty because of the presence of water in the fractionator. For example in the separation of ethylene, the temperatures are sufficiently low, and the pressures sufficiently high, that water will form hydrates with the ethylene and these hydrates will accumulate so as to produce solids which may render the column incapable of passing its required vapor or liquid load. Methanol is used as a means of minimizing hydrate formation if the means of getting the methanol to the proper place in the column is available. Methanol is, at best, only an emergency answer to the problem, however; complete feed dehydration is the most desirable solution.

In order to assure substantial freedom from the various problems attendant with hydrocarbon hydrate formation mentioned above, the cracked gas must be dehydrated to a dew point not higher than −35° F. for processing at low-temperature hydrocarbon separation plants.

Desiccants such as Sovabead, silica gel, and activated alumina have been used to dry cracked gas. The use of such desiccants for dehydration has the following disadvantages: The co-adsorbed hydrocarbons foul the desiccant thereby shortening its life. The effluent dew point is sufficiently high so that frequent de-icing of the distillation equipment is required. Low water capacity at low water vapor pressure. Low water capacity at elevated temperatures. Silica gel or Sovabead fractures when liquid water or vapor droplets come in contact with it.

The principal object of the invention is to provide an improved process for drying a thermally cracked hydrocarbon gas stream. Further objects are to provide a method for drying a thermally cracked hydrocarbon gas stream wherein crystalline zeolitic molecular sieve material is used as the adsorbent material and such material retains its high adsorbing characteristics for an unusually long time. Another object is to provide a dehydration system wherein at least two zeolitic molecular sieve material beds are operated in series on an adsorption stroke. Still another object of the invention is to provide a process for drying a thermally cracked hydrocarbon gas stream by contacting such stream with a crystalline zeolitic molecular sieve bed wherein coking and clogging of the pores of such sieve material is substantially completely eliminated.

Other objects and advantages will be apparent from the subsequent disclosure and appended claims.

Figure 1:
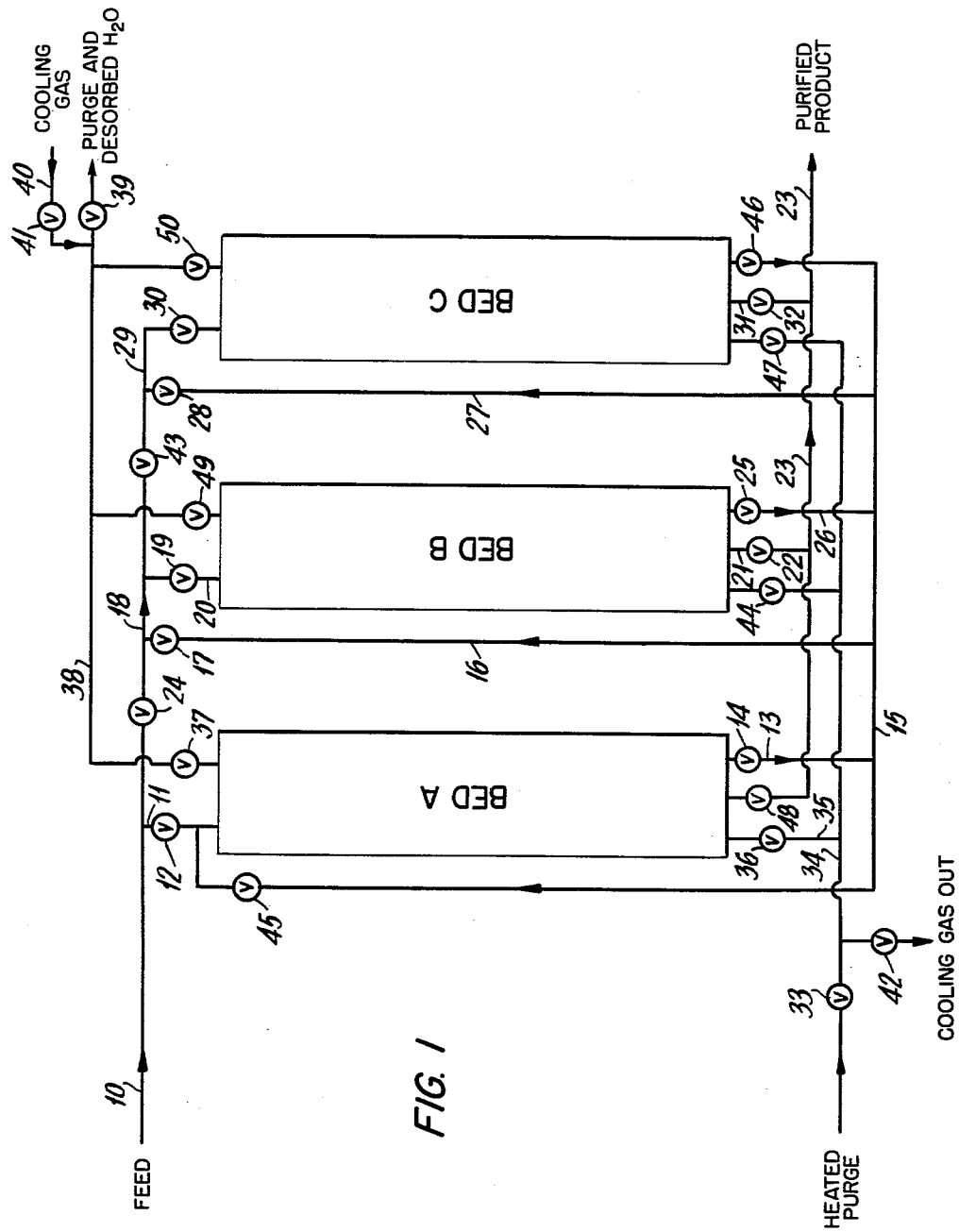
FIG. 1 is a schematic flowsheet of the preferred three-bed series operated system for drying cracked gas according to the invention.

It is to be understood that the expression "pore size," as used herein refers to the apparent pore size, as distinguished from the effective pore diameter. The apparent pore size may be defined as the maximum critical dimension of the molecular species which is adsorbed by the zeolitic molecular sieve in question, under normal conditions. Maximum critical dimension may be defined as the diameter of the smallest cylinder which will accommodate a model of the molecule constructed using the best available values of bond distances, bond angles, and Van der Waal radii. Effective pore diameter is defined as the free diameter of appropriate silicate ring in the zeolite structure. The apparent pore size for a given zeolitic molecular sieve will normally be larger than the effective pore diameter.

It has been found that certain naturally occurring and synthetic crystalline zeolites may be utilized to separate water from a thermally cracked hydrocarbon gas stream. Present molecular sieves are so constituted in their structural arrangement of atoms that they can effect a separation of cracked gases and water on the basis of molecular polarity. These particular zeolites not only have a high affinity for water but will adsorb it preferentially to hydrocarbon molecules of similar molecular dimensions. In addition, these zeolites demonstrate a high water capacity at low vapor pressures and at elevated temperatures, thereby overcoming critical limitations of prior art cracked gas dehydrating systems.

The term "zeolite," in general, refers to a group of naturally occurring and synthetic hydrated metal aluminosilicates, many of which are crystalline in structure. There are, however, significant differences between the various synthetic and natural materials in chemical composition, crystal structure and physical properties such as X-ray powder diffraction patterns.

The structure of crystalline zeolite molecular sieves may be described as an open three-dimensional framework of $SiO_4$ and $AlO_4$ tetrahedra. The tetrahedra are crosslinked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off substantially all of the water of hydration. The space remaining in the crystals after activation is available for adsorption of adsorbate molecules. This space is available for adsorption of molecules having a size, shape and energy which permits entry of the adsorbate molecules into the pores of the molecular sieves.

The zeolites occur as agglomerates of fine crystals or are synthesized as fine powders and are preferably tableted or pelletized for large-scale adsorption uses. Pelletizing methods are known which are very satisfactory because the sorptive character of the zeolite, both with regard to selectivity and capacity, remains essentially unchanged.

Among the naturally occurring zeolitic molecular sieves suitable for use in the present invention are chabazite and erionite, mordenite, and faujasite. The natural materials are adequately described in the chemical art. The suitable synthetic zeolitic molecular sieves include zeolites A, D, R, S, T, X, Y and L.

The preferred materials are any having a pore size of at least about 4.6 Angstrom units and include erionite, calcium-rich chabazite, faujasite and the synthetic divalent cation-exchanged types A, X, Y, L, D, R and T.

The pore size of the zeolitic molecular sieves may be varied by employing different metal cations. For example, sodium zeolite A has a pore size of about 4 Angstrom units whereas calcium zeolite A has a pore size of about 5 Angstrom units, when calcium cations have been exchanged for at least about 40 percent of the sodium cations, so that the latter would be suitable as a preferred material for use in the present invention.

Zeolite A is a crystalline zeolitic molecular sieve which may be represented by the formula:

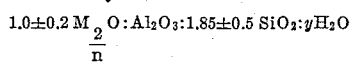

wherein M represents a metal, $n$ is the valence of M, and $y$ may have any value up to about 6. The as-synthesized zeolite A contains primarily sodium ions and is designated sodium zeolite A. Zeolite A is described in more detail in U.S. Patent No. 2,882,243, issued April 14, 1959.

Zeolite T is a synthetic crystalline zeolitic molecular sieve whose composition may be expressed in terms of oxide mole ratios as follows:

$$1.1 \pm 0.4 \ [xNa_2O:(1-x)K_2O]:Al_2O_3:6.9 \pm 0.5 \ SiO_2 yH_2O$$

wherein "$x$" is any value from about 0.1 to about 0.8 and "$y$" is any value from about zero to about 8. Further characterization of zeolite T by means of X-ray diffraction techniques is described in copending application Serial No. 733,819, filed May 8, 1958, now Patent No. 2,950,952, issued August 30, 1960.

Zeolite X is a synthetic crystalline zeolitic molecular sieve which may be represented by the formula:

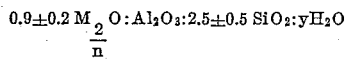

wherein M represents a metal, particularly alkali and alkaline earth metals, $n$ is the valence of M, and $y$ may have any value up to about 8, depending on the identity of M and the degree of hydration of the crystalline zeolite. Sodium zeolite X has an apparent pore size of about 10 Angstrom units. Zeolite X, its X-ray diffraction pattern, its properties, and methods for its preparation are described in detail in U.S. Patent No. 2,882,244, issued April 14, 1959.

Zeolite Y is described and claimed in U.S. patent application Serial No. 728,057, now abandoned, filed April 14, 1958, and in U.S. patent application Serial No. 862,062, now abandoned, filed concurrently herewith both in the name of D. W. Breck.

Zeolite L is described and claimed in U.S. patent application Serial No. 711,565, now abandoned, filed January 28, 1958, in the names of D. W. Breck and N. A. Acara.

Zeolite D is described and claimed in U.S. patent application Serial No. 680,383, filed August 26, 1957, in the names of D. W. Breck and N. A. Acara.

Zeolite R is described and claimed in U.S. patent application Serial No. 680,381, filed August 26, 1957, now Patent No. 3,030,181, issued April 17, 1962, in the name of R. M. Milton.

The present invention in its broadest aspect relates to a method of separating water from a hydrocarbon fluid by intimately mixing crystalline zeolitic molecular sieve material having a pore size of at least 4 Angstrom units with said water and said hydrocarbon fluid and adsorbing the water on said zeolitic molecular sieve materials.

More particularly the present invention contemplates a method for drying a thermally cracked hydrocarbon gas stream in which there is provided a fixed bed of crystalline zeolitic molecular sieve material having pore sizes of at least 4 Angstrom units. A water-laden cracked hydrocarbon gas stream is provided and contacted with the zeolitic molecular sieve bed by introducing the gas stream at one end of said bed to adsorb at least most of said water. Additionally in the adsorption process the bed of sieve material will also adsorb those hydrocarbon molecules which are of suitable molecular size and shape to be capable of being adsorbed by the sieve. A water-depleted cracked gas stream is discharged from the bed and is ready for further processing.

Unusually long sieve life at almost 100% adsorbing efficiency is realized according to the method of the invention by establishing a water adsorption front at one end of the zeolitic molecular sieve bed. The water front is progressively moved longitudinally through the bed to the opposite end thereof. As the water front moves through the bed, hydrocarbons which have been adsorbed from the cracked gas stream are displaced from the zone of said progressing water adsorption front. Thereafter the bed is reactivated by dehydrating the sieve bed.

The advantages of drying cracked gas according to the method of the invention over drying with silica gel, Sovabead or activated alumina are:

(1) Lower sensitivity to coking.
(2) Lower sensitivity to low water vapor pressure.
(3) Lower sensitivity to high operating temperature.
(4) Lower effluent water concentration.

As used in the specification and ensuing claims, the expression "cracked hydrocarbon gas stream" refers to a product stream obtained by thermally decomposing hydrocarbons to produce olefins.

As previously discussed and illustrated, certain zeolitic molecular sieves have a high affinity for water and will preferentially adsorb it rather than the hydrocarbon constituents, even though some of the latter have molecular dimensions such that they will enter the internal adsorption areas of the molecular sieves. In addition, these same zeolitic molecular sieves demonstrate a high water capacity at low water vapor pressures and at elevated temperatures. These remarkable and unexpected characteristics are clearly illustrated in FIGS. 3 through 5, which represent tests on sodium zeolite A having a pore size of about 4 Angstrom units, and comparisons with the behavior of alumina and silica gel under the same conditions.

Figure 3:
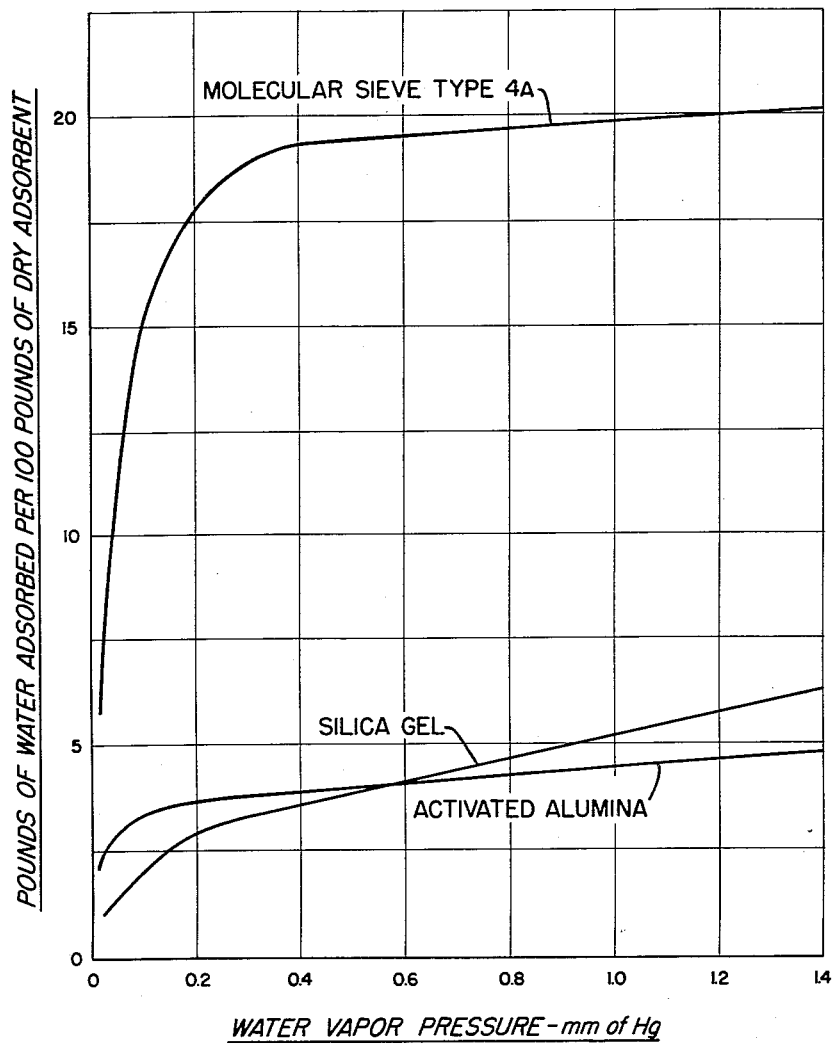
FIG. 3 shows water adsorption isotherms at 25° C. for various materials at relatively low pressure.

FIG. 3 shows water adsorption isotherms for sodium zeolite A (4A) silica gel, and activated alumina at a temperature of 25° C., with lbs. of water adsorbed per 100 lbs. of dry adsorbent being plotted against the water vapor pressure in mm. of Hg. An inspection of FIG. 3 will reveal the remarkably high capacity of zeolite 4A for water at low vapor pressures as compared to conventional adsorbents. For example, at a water vapor pressure of 0.2 mm. Hg, the capacity of zeolite 4A is about 17.7 lbs., whereas the capacities of activated alumina and silica gel are about 3.5 lbs. and 3.0 lbs. of water respectively. This means that the water capacity of zeolite 4A is at least 5 times that of commonly employed adsorbents at 0.2 mm. Hg. There are frequent industrial situations where an inlet cracked gas has a relatively small moisture content but even such water traces are detrimental in the apparatus in which the gas is to be processed. One situation of this type is a low-temperature cracked gas distillation column, where very small quantities of water or gas hydrate could freeze out on the liquid gas contract surfaces and eventually cause shutdown. The present invention obviates this problem by providing an adsorption process which substantially removes water traces to a dew point of −35° F. or lower in a highly efficient manner.

Figure 4:
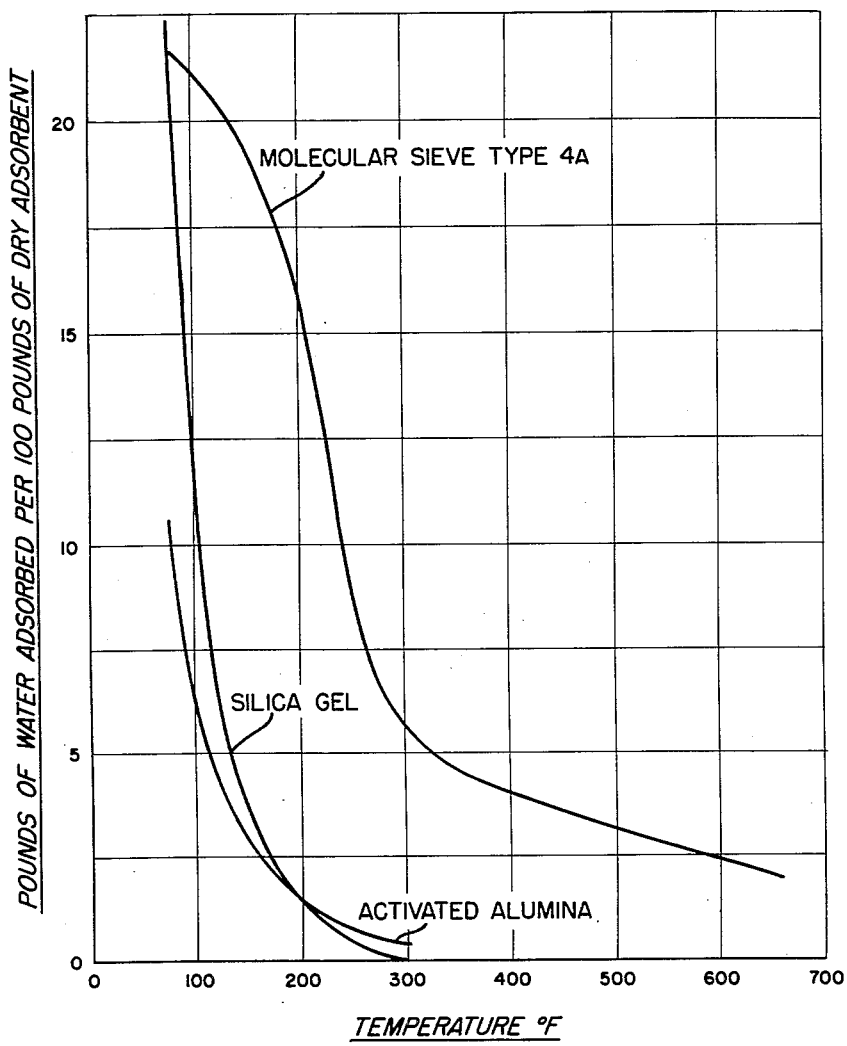
FIG. 4 shows water adsorption isobars for various materials at elevated temperature.

FIG. 4 shows water adsorption isobars for zeolite 4A, silica gel and activated alumina at a water vapor pressure of 10 mm. Hg. It will be readily apparent that the water capacities of silica gel and activated alumina drop sharply at temperatures approaching 100° F. and at 200° F. such capacities are only about 1.5 lbs. of water 100 lbs. adsorbent. In marked contrast, the water capacity of sodium zeolite type 4A at 200° F. is about 15.8 lbs. per 100 lbs. Furthermore, zeolite 4A at 400° F. retains a capacity for water of greater than 3 percent, whereas the common adsorbents have essentially no capacity at 300° F. The water adsorption capacity of zeolite 5A is essentially the same as that of zeolite 4A. This characteristic of the present zeolitic molecular sieves is of the utmost importance in water-cracked gas adsorption systems operating at above ambient temperatures, as commonly employed adsorbents are completely unusable. For example, if a cracked gas stream is to be processed above about 100° F., neither silica gel nor activated alumina can be considered satisfactory as adsorbents. It is necessary to either cool the gas to a temperature level at which such adsorbents have reasonable capacities. The present invention permits the employment of a highly efficient adsorption system at elevated temperatures, thereby eliminating the necessity of using valuable refrigeration to cool the inlet cracked gas.

Figure 5:
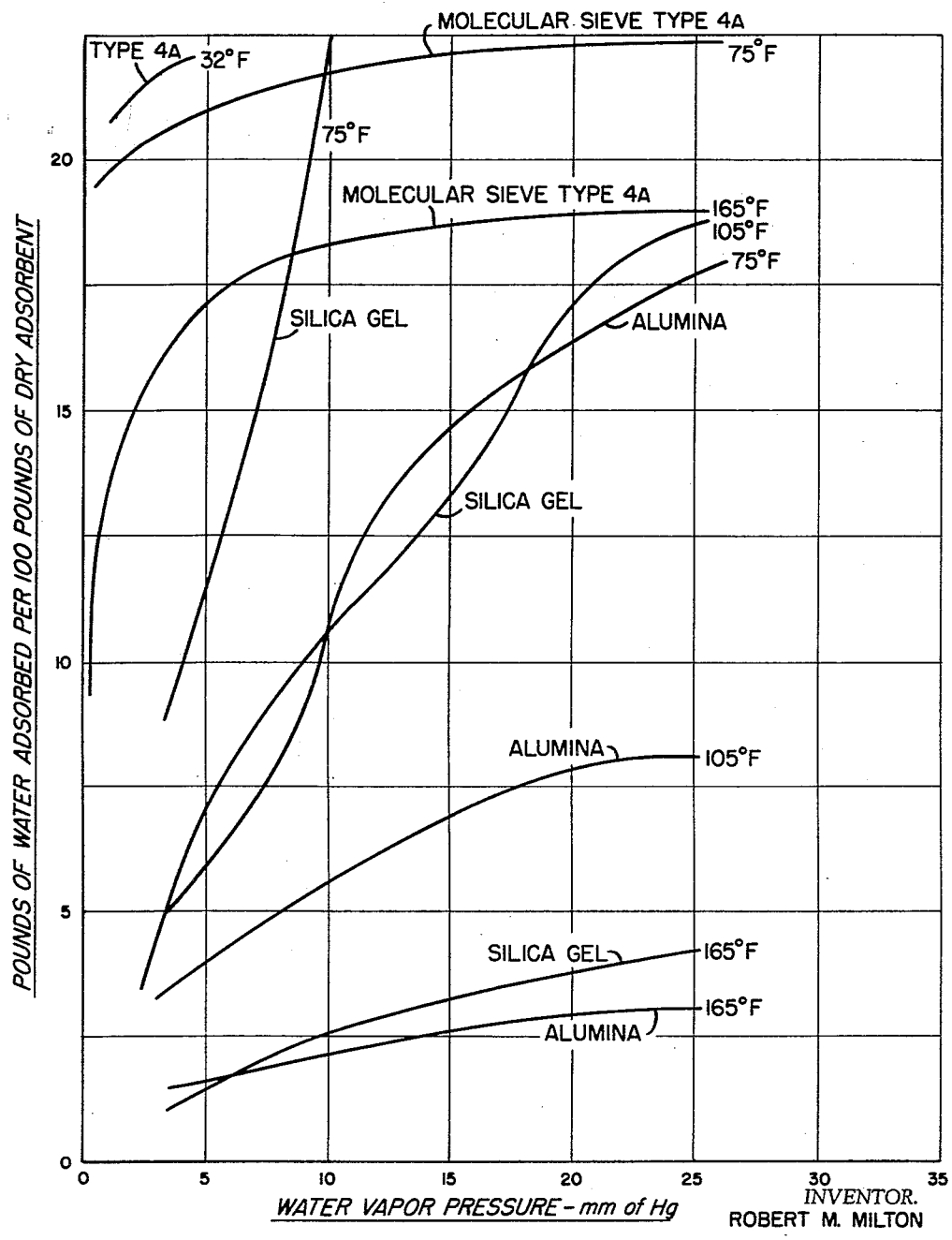
FIG. 5 shows a series of water adsorption isotherms for various materials at certain elevated temperatures.

FIG. 5 is a series of water adsorption isotherms for temperatures of 32° F., 75° F., 105° F. and 165° F. These curves again show that silica gel and activated alumina lose their adsorption capacities rapidly as the adsorption temperature increases, whereas sodium zeolite type 4A only suffers a slight reduction in water capacity when the temperature is increased from 75° F. to 165° F.

The present invention provides a method which is uniquely suited for dehydrating cracked gas to a dew point at least as low as −35° F. so that the gas may be employed in low-temperature hydrocarbon separation systems.

When attempting to remove moisture from cracked gas using a bed of any adsorbent material there are always some adsorbed hydrocarbons which foul the desiccant thereby shortening its life.

This is true even of zeolitic molecular sieves. As the water-laden cracked gas stream pasess through the sieve bed some hydrocarbons having a molecular dimension capable of fitting through the sieve pore will be adsorbed. When the adsorbent is thermally reactivated, the high temperature required will cause formation of hydrocarbon residues resulting in corresponding loss of capacity and effectiveness of the sieve.

Figure 2:
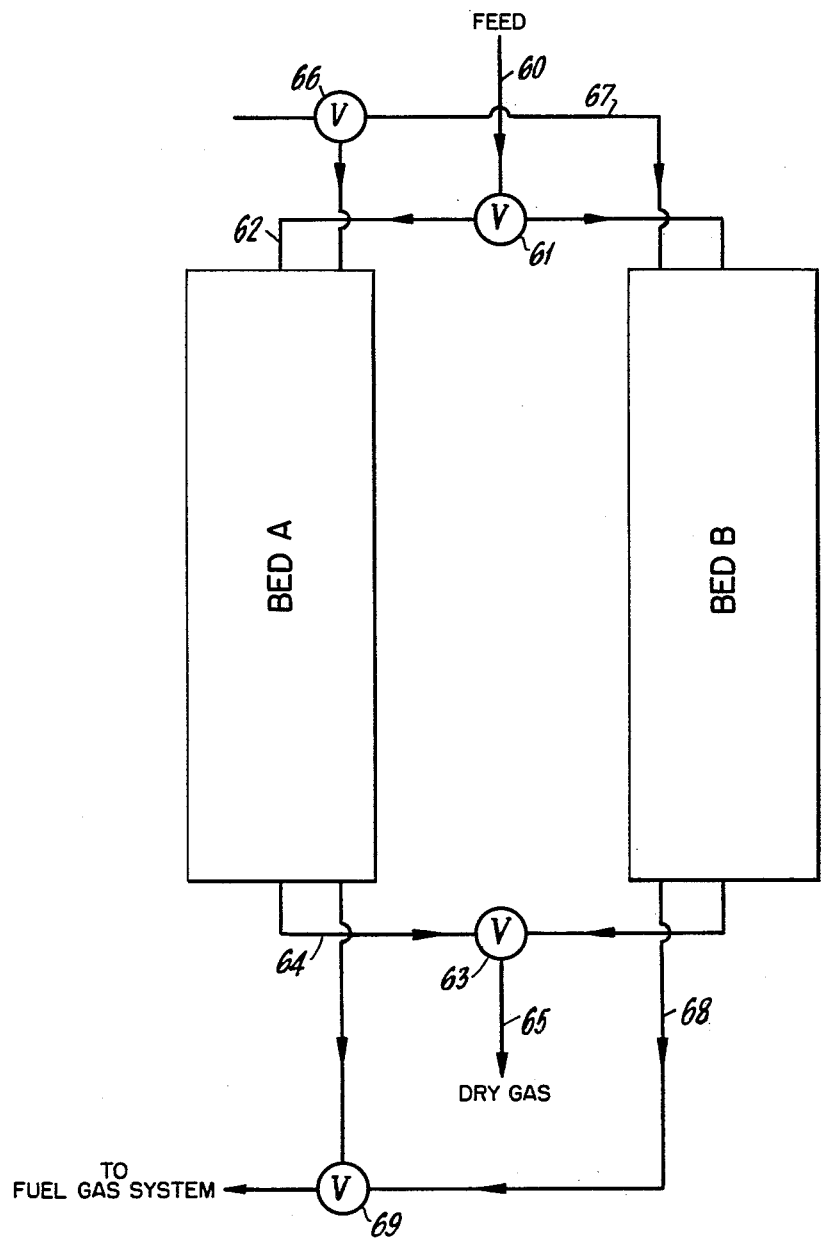
FIG. 2 is a schematic flowsheet of a two-bed system for dehydrating cracked gas according to the invention.

It has been discovered that the life of a molecular sieve adsorbent used to dry cracked gases can be unexpectedly prolonged by establishing a water adsorption front in the molecular sieve bed and using such front to continually displace hydrocarbons from the zone of such water front until there is substantially no hydrocarbon left in the molecular sieve bed to deleteriously affect such bed. In one method of practicing the invention there is provided a dual bed adsorption system as shown in FIG. 2. Each bed contains molecular sieve material having an apparent pore size of at least 4 Angstrom units. A pore size of at least 4.6 angstroms is preferred because the water adsorption front will be established more easily if $C_3$ and $C_4$ hydrocarbon molecules can have an easy ingress and egress from the inner adsorption area of the sieve. The water-laden cracked gas feed stream is contacted with the first zeolitic molecular sieve bed as an adsorption stroke, thereby adsorbing at least most of the water and some of the hydrocarbons. A water depleted cracked gas stream is discharged from the bed. At water breakthrough, that is when the stream leaving the bed has the maximum allowable dew point not greater than −35° F., the adsorption cycle is preferrably stopped. At this point most of the hydrocarbons adsorbed are located toward the effluent end of the bed. In order to avoid coking of the sieve material on the desorption stroke, cocurrent desorption is employed (hot purging gas is caused to flow through the bed in same direction as the feed stream). As a desorption stroke, the molecular sieve material at the inlet end of the bed is contacted with a hot purge gas. As the temperature increases the more strongly held water will be desorbed and a water desorption front established at one end of the bed. The moisture from this desorption front will be readsorbed by the cooler molecular sieve in a moving water adsorption front further down the bed and the water "pulse" which is created because of the continual desorption and adsorption of the water molecules is caused to move longitudinally through the bed by the hot purge gas. As such water-adsorption front of the water pulse progresses through the bed, the hydrocarbons in the bed are continually desorbed, in favor of the more strongly held water. The result is that the hot purge gas never comes in contact with the hydrocarbons since the water acts as a buffer, and coking is substantially eliminated since heat and hydrocarbons are necessary for coking.

In another and preferred form of the invention a 3-bed series flow system is employed (see FIG. 1). In this system each bed again contains a zeolitic molecular sieve material having pore sizes of at least 4 Angstrom units. The water-laden cracked gas feed stream is contacted with the first zeolitic molecular sieve bed. In this method, because of the sieve's greater affinity for water, such water in the feed stream is adsorbed in preference to any hydrocarbons. However, as the water-laden feed stream continues to be fed to the sieve bed, a water adsorption front is established at the inlet end of the bed. In this case the water in the adsorption front is adsorbed by the sieve material thereby displacing the les strongly held hydrocarbon molecules which may have been adsorbed. As the water-laden feed stream continues to be fed to the bed, the water-adsorption front moves longitudinally through the bed. In this method of the invention the feed stream is continuously fed to the first bed until the water adsorption front moves out of the first bed into the series connected second bed. As a result, the first bed is substantially free of adsorbed hydrocarbon molecules so that on subsequent desorption utilizing hot purge gas there is no danger of coking of the sieve material.

It should be understood that when processing a cracked gas in this series operation method, only water impurity is being removed and other impurities such as hydrogen sulfide should be taken out by other methods such as amine scrubbers.

In order that those skilled in the art might clearly understand the present invention the following example is presented. Under conditions in the example given below a cracked gas stream can be purified to a dew point of −35° F. or lower thereby substantially reducing the freeze-up difficulties in the low-temperature demethanizer unit.

In this example the feed comprises a hydrocarbon gas stream from a cracking unit and contains water impurity at a concentration which is troublesome in the olefin recovery (demethanizer) unit. If the stream has been treated to remove hydrogen sulfide in a conventional amine method, it will be water-saturated at the temperature which may be as high as about 120° F. Saturation at 70° F. is a normal figure.

The temperature of the feed gas entering the molecular sieve bed may be the ambient for the location; any temperature from 32° F. to about 200° F. may be employed and the adsorbent capacity and product gas dew point will not be substantially changed. If temperatures much lower than 32° F. are utilized the problem of ice formation arises. If temperatures much above 200° F. are utilized the sieve capacity begins to drop although in the case of zeolite A it still has a water adsorption capacity at 200° F. The adsorption pressure may be atmospheric or super atmospheric. The pressure for adsorption is preferably the same as that to be employed in the demethanizer so that the moisture content will be controlled effectively. If the molecular sieve adsorption were done at low pressure and the purified stream subjected to pressurization, the actual dew point would rise perhaps to troublesome levels.

The adsorption stroke is terminated in Bed A after the water adsorption front leaves Bed A and transfers to Bed B. A water-depleted cracked gas stream leaves the discharge end of the Bed B and is supplied as a purified product to an olefin recovery unit (demethanizing unit). Then Bed C is put on stream in series with Bed B and the water-laden cracked gas feed stream is supplied directly to the inlet end of Bed B so that the adsorption stroke is continued through Beds B and C while Bed A is being reactivated. (See FIG. 1.)

Regeneration or desorption is accomplished by releasing the pressure from Bed A and raising its temperature using a heated purge gas. Any non-reactive gas such as nitrogen, hydrogen, methane and carbon monoxide may be used. The off-gas from the demethanizer unit which consists primarily of hydrogen and methane is most convenient. The bed temperature is raised to 450° to 600° F. with the heated purge gas flowing countercurrently to the direction of the adsorption stroke flow. When the entire bed has reached 450° F. the desorption is sufficiently complete to achieve satisfactory operation upon return to adsorption; however, if in the timing of the overall process cycle there remains time before Bed A is to be returned to adsorption, additional purging may be done to further reduce the residual water on the molecular sieve and thus obtain higher operating capacity.

The heated purge may be used at atmospheric or higher pressure. Pressures as high as 250 p.s.i.g. will permit efficient operation with lower superficial gas velocities than at lower pressures.

Following heating and purging the bed is recooled to 200° F. or lower using any suitable cooling medium as for example cool demethanizer top gas. The cooling gas flow through the bed may be in either direction.

In a cyclic manner, when the moisture content of the effluent from Bed B has risen to the level of that in the feed, Bed B is taken off-stream and Bed A is put on-stream in series flow following Bed C.

Referring more specifically to the drawings, in FIG. 1 the water-laden thermally cracked gas feed stream is introduced through conduit 10, branch conduit 11 and valve 12 to zeolitic molecular sieve Bed A. The feed stream remains on until the water adsorption front established as described above leaves Bed A through branch conduit 13 and valve 14 and enters Bed B through conduits 15 and 16, valve 17, branch conduit 18, valve 19 and branch conduit 20. Both Beds A and B are on adsorption and under pressure preferably the same as that in the demethanizer unit. A water-depleted cracked gas stream leaves Bed B through conduit 21, valve 22 and conduit 23 and is ready for further processing. The adsorption stroke is terminated after a sufficient period has elapsed after the water breakthrough point to allow the adsorption front to leave Bed A and enter Bed B. Then Bed C is put on-stream in series with Bed B. Now, previously closed valve 24 opens permitting the feed stream to be introduced directly to Bed B through conduit 18 and valve 19 and branch conduit 20. The adsorption front is established in Bed B and progresses therethrough and transfers by valve 25, branch conduit 26, conduits 15 and 27, valve 28, conduit 29, valve 30 to Bed C. A water-depleted cracked gas stream leaves Bed C via conduit 31 and valve 32 and is ready for further processing. While Beds B and C are adsorbing, Bed A is being reactivated. On desorption the pressure on Bed A is released and a hot purge gas is fed to Bed A through valve 33, conduits 34 and 35 and valve 36 to heat the Bed A to a temperature of from about 450° to 600° F. to effect reactivation of the molecular sieve. Temperatures much above 600° F. will cause cracking of any residual hydrocarbon traces which are not displaced. Temperatures below 450° F. will not be high enough to effect efficient reactivation. The purge gas leaves the Bed A through valve 37 and conduit 38 and is collected through valve 39. Following heating and purging the bed is recooled to 200° F. or lower by introducing cooling gas through conduit 40, valve 41, conduit 38, valve 37 to Bed A. Cooling gas leaves by valve 36, conduit 34 and valve 42. While Beds B and C are adsorbing and A is being reactivated, the following valves are closed: 12, 43, 22, 44, 45, 46, 47, 42, 48, 14, 49, 50, 51 and 17. It is to be understood that for the various combinations of series beds, on adsorption the appropriate valves will be opened and that the above decription is included merely for explanatory purposes.

FIG. 2 illustrates a flowsheet for an alternate method of carrying out the invention. In this embodiment water-laden cracked gas is fed through conduit 60 to two-way valve 61 which is adjusted so as to cause the flow to be directed through conduit 62 to Bed A. Water depleted gas leaves Bed A through two-way valve 63 and conduits 64 and 65 into a supply line for further processing. While Bed A is on adsorption, Bed B is on desorption. Bed B is desorbed by introducing hot purge gas by valve 66 and conduit 67 in a cocurrent direction. The hot purge gas heats the bed to a temperature of from about 450° to about 600° F. thereby establishing a water pulse as described above. The water adsorption front of the water pulse is caused to move through the Bed B by the hot purge gas. The desorbed hydrocarbons, water and purge gas leave Bed B by conduit 68 and valve 69. After the Bed B is reactivated, cool gas is passed in the same manner through Bed B to bring it to a temperature of 200° F. or lower as was the case in the embodiment of FIG. 1. Cocurrent desorption is preferred in this process to assure replacement of adsorbed hydrocarbons on the effluent end of the bed by the water pulse prior to heating. If countercurrent desorption were used, adsorbed hydrocarbons on the effluent end, where little or no water is adsorbed, would be polymerized and subsequently cracked by the hot gas stream. Considerably less desiccant coking results by using cocurrent desorption to drive the water from the inlet section of the bed to the outlet section. This provides a means of replacing the hydrocarbons before the heating wave enters this section.

Although two embodiments of the invention have been discussed in detail, it is contemplated that modifications of the methods may be made and that some features may be employed without others, all within the spirit and scope of the invention.

This is a continuation-in-part application of my co-pending application, Serial No. 400,385, filed December 24, 1953; now abandoned.

What is claimed is:

1. A method for continuously drying a cracked hydrocarbon gas stream which comprises the steps of providing at least three separate zones each containing a bed of crystalline zeolitic molecular sieve material having pore sizes of at least 4 Angstrom units; connecting at least two of such beds in series; providing a water-laden cracked hydrocarbon gas stream at a temperature of from about 32° to 200° F. and contacting such stream as an adsorption stroke with a first zeolitic molecular sieve bed by introducing such gas stream to the inlet end of the first bed to adsorb at least most of said water and part of the hydrocarbons; establishing a water adsorption front at said inlet end of said first bed; progressively moving such front longitudinally through such first bed to the opposite end thereof, continuing to move such front out of said first bed into the inlet end of said second bed connected in series thereby substantially completely displacing said hydrocarbons from said first bed; introducing the water-laden cracked gas stream to the inlet end of said second bed and contacting such stream with said second bed; thereafter connecting said second bed in series flow relationship with a third bed as an adsorption stroke; simultaneously flowing a hot purge gas through said first bed countercurrently to the direction of the adsorption stroke flow thereby desorbing the water from the bed for reactivation thereof; discharging a water-depleted cracked hydrocarbon gas stream from the opposite end of said second bed; and periodically switching the flows among the beds so that at least two beds are always connected in series flow relationship and are on an adsorption stroke and the remaining beds are being reactivated on a desorption stroke.

2. A method according to claim 1 wherein the crystalline zeolitic molecular sieve material has pore sizes of at least 4.6 Angstrom units.

3. A method according to claim 1 wherein the water-laden cracked hydrocarbon gas feed stream has been substantially freed of sulfur compounds.

4. A method for continuously drying a cracked hydrocarbon gas stream which comprises the steps of providing at least two separate zones each containing a bed of crystalline zeolitic molecular sieve material having pore sizes of at least 4 Angstrom units; providing a water-laden cracked hydrocarbon gas stream at a temperature of from about 32° to 200° F. and contacting such stream with a first zeolitic molecular sieve bed as an adsorption stroke by introducing the gas stream to the inlet of said bed to adsorb at least most of said water and part of the hydrocarbons, discharging a water-depleted cracked hydrocarbon gas stream from the opposite end of said bed; stopping the adsorption stroke when the stream leaving the bed has a maximum allowable dew point not greater than −35° F. establishing a water pulse consisting of a water desorption front and a water adsorption front as a desorption stroke by introducing a hot purge gas at the inlet of the second molecular sieve bed, progressively moving such pulse longitudinally through such second bed from the inlet end to the opposite end thereof, thereby displacing said hydrocarbons from the zone of the progressing water adsorption front of said water pulse by keeping said water adsorption front between said hot purge gas and said hydrocarbons to eliminate coking; continuing to move such pulse through the bed until the desorbed hydrocarbons leave said bed thereafter removing water from said second bed for reactivation thereof; periodically switching the flows between the first and second beds thereby passing the water-laden cracked gas stream as a gas feed stream to said second bed as an adsorption stroke and establishing a water pulse in said first bed as a desorption stroke.

5. A method according to claim 4 wherein the zeolitic molecular sieve material is selected from the class consisting of the naturally occurring crystallin molecular sieves mordenite, chabazite, erionite and faujasite and the synthetic crystalline zeolitic molecular sieve types D, R, S, T, A, X, Y and L.

6. A method for continuously drying a cracked hydrocarbon gas stream which comprises the steps of providing at least two separate zones each containing a bed of crystalline zeolitic molecular sieve material having pore sizes of at least 4 Angstrom units; providing a water-laden cracked gas stream at a temperature of from about 32° to 200° F. and contacting such stream with a first zeolitic molecular sieve bed as an adsorption stroke by introducing the gas stream at the inlet end of said bed to adsorb at least most of said water and part of the hydrocarbons, discharging a water-depleted cracked gas stream from the opposite end of said bed; stopping the adsorption stroke when the stream leaving the bed has a maximum allowable dew point not greater than −35° F. establishing a water pulse consisting of a water desorption front and a water adsorption front as a desorption stroke at the inlet end of the second molecular sieve bed by introducing a heated purge gas at the inlet end of said second molecular sieve bed to heat such bed to a temperature of from about 450° to about 600° F. thereby desorbing the previously adsorbed water, progressively moving such water pulse longitudinally through such bed from the inlet end to the opposite end thereof, thereby displacing said hydrocarbons from the zone of the progressing water adsorption front of said water pulse; continuing to move such water pulse until said hydrocarbons leave said bed through said second bed until said bed is substantially reactivated; periodically switching the flows between the first and second beds thereby passing the water-laden cracked gas stream as a gas feed stream to said second bed as an adsorption storke and establishing a water pulse in said first bed as a desorption stroke.

References Cited in the file of this patent
UNITED STATES PATENTS

| 1,872,783 | Miller | Aug. 23, 1932 |
| 2,570,974 | Neuhart | Oct. 9, 1951 |
| 2,866,835 | Kimberlin et al. | Dec. 30, 1958 |
| 2,944,627 | Skarstrom | July 12, 1960 |

OTHER REFERENCES

Separation of Mixture Using Zeolites as Molecular Sieves, Parts I, II, III. Barrer, J. Soc. Chem. Ind., vol. 64, May 1945, pages 130–135.

Molecular-Sieve Action of Solids, Barrer, Quarterly Reviews, Chem. Soc. Lond., vol. III, 1949, pages 293–320.